Jan. 29, 1924.
J. W. DEBEN
1,481,989
SYRINGE
Filed Nov. 15, 1922
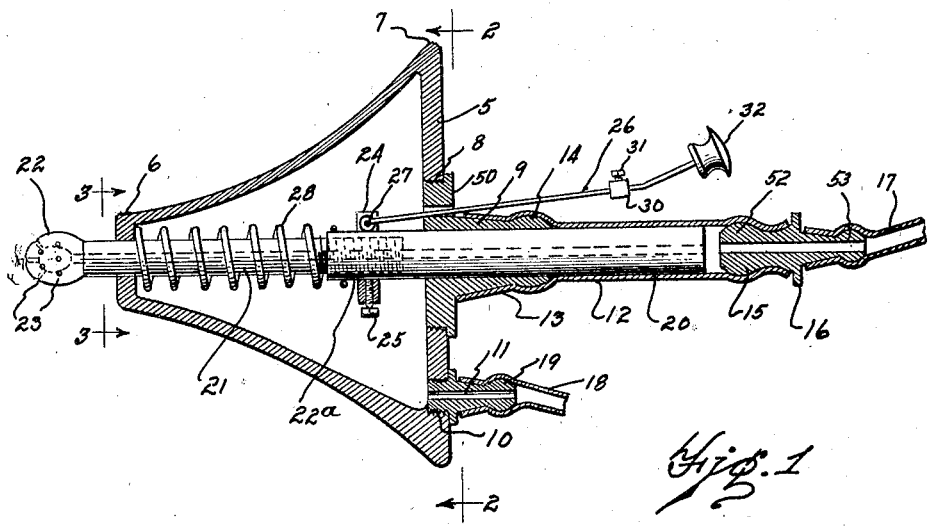
Fig. 1
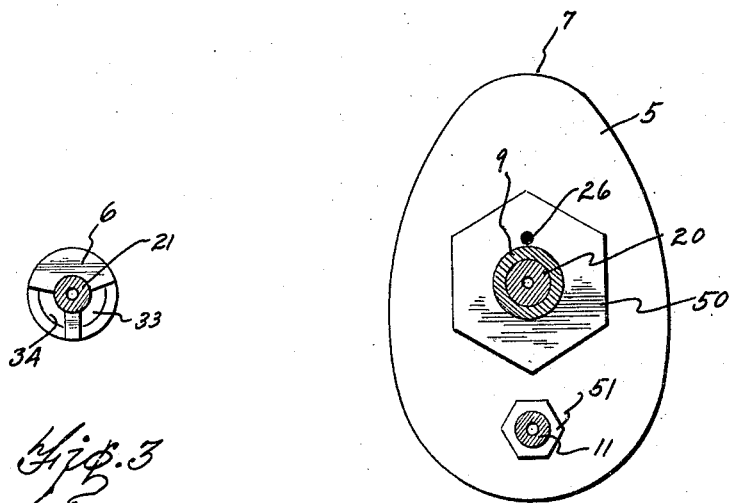
Fig. 3
Fig. 2
Inventor
JOSEPH W. DEBEN
By *Hing Harness*
Attorney Patented Jan. 29, 1924.

1,481,989

UNITED STATES PATENT OFFICE.

JOSEPH W. DEBEN, OF DETROIT, MICHIGAN.

SYRINGE.

Application filed November 15, 1922. Serial No. 601,155.

*To all whom it may concern:*

Be it known that I, JOSEPH W. DEBEN, a citizen of the United States, and resident of the city of Detroit, county of Wayne, and State of Michigan, have invented certain new and useful Improvements in Syringes, of which the following is a specification, reference being had to the accompanying drawings.

It is a primary object of my invention to provide a syringe of cheap and economical construction and wherein a movable spraying nozzle is provided. It is also an object to provide means for removing liquid after it has passed through the spraying nozzle.

With these and other objects in view, my invention consists in the arrangement, combination and construction of the various parts of my improved device, as described in the specification, claimed in my claims and shown in the accompanying drawings, in which:

Fig. 1 is a central sectional view of my improved device.

Fig. 2 is a view taken on line 2—2 of Fig. 1 and

Fig. 3 is a view taken on line 3—3 of Fig. 1.

I have shown a member 5 tapering in form to a relatively small end 6 from a relatively larger end 7. Adapted to be fitted into the back thereof by means of screw threads 8, is a member 9 having a hexagon portion 50 adjacent the screw threads. Also adapted to be fitted into the back thereof through the screw threads 10, is a similar tubular member 11, having a hexagon portion 51 adjacent the screw threads.

Fitted over the member 9 is a tubular member 12 having an end 13 of relatively flexible material so as to engage the ridge 14 provided on the member 9 so as to prevent displacement therefrom under ordinary usage. The tubular member 12 is adapted to fit over a tubular member 15 at the opposite end thereof and to be held from displacement therefrom by the ridge 52, and to be separated by a collar 16 on the member 15 from a hose 17 secured on the opposite end of the member 15 by the ridge 53 provided on the rearward end of the member 15.

The tubular member 11 has a hose 18 fitted thereover and secured against displacement in ordinary usage by means of the ridge 19.

Disposed partly within the member 12 and partly within the member 5 is a tubular member 20 having a second tubular member 21 screwed therein within the member 5 as shown at the screw threads 22ᵃ. The tubular member 21 is provided with a nozzle 22 on the forward end thereof having a series of holes 23 therein from which liquid may pass.

The member 20 is provided with a collar 24 secured thereon by a set screw 25 to which a rod or wire 26 is secured as at 27. A coil spring 28 is provided around the tubular member 21 and the forward end of the tubular member 20 between the end 6 of the member 5 and the collar 24 on the tubular member 20.

A stop 30 controlled by a set screw 31 is provided on the rod or wire 26 so as to regulate as desired the forward movement of the rod when pressure is brought to bear upon the knob 32 provided on the rearward end of the member 26.

The end 6 of the member 5 is provided with a pair of openings 33 and 34 on its face as is shown in Fig. 3.

In the practical operation of my improved device, the nozzle 22 and the end 6 of the member 5 may be inserted in the cavity desired to be treated and liquid allowed to flow from a suitable source of supply through the tubular members 17, 15, 20 and 21 out through the holes 23 provided in the nozzle 22. At the same time, the knob 32 on the end of the rod 26 may be pressed inwardly so as to extend the tubular member 21 to its full length. When pressure is relieved from the knob 32, the coil spring 28 will cause the backward movement of the member 21 to its normal position shown in Fig. 1. Thus varying depths of the cavity may be treated as desired.

The liquid which has been dispensed through the nozzle 23 and which has collected in the cavity being treated, may then flow through the openings 33 and 34 in the end 6 of the member 5 and down the inner wall of the member 5 out through the tubular members 11 and 18 into a suitable receptacle.

It is obvious that various changes may be made in the arrangement, combination and construction of the various parts of my improved device without departing from the spirit of my invention and it is my intention to cover by my claims such changes as may be reasonably included within the scope thereof.

What I claim is:

1. A device of the class described, comprising a member having a relatively small end portion, a tubular member extending through said end portion adapted for the passage of liquid therethrough, a coil spring encircling said tubular member and held between the end of said end portion and a projection on said tubular member, means consisting of a rod extended into said first member and attached to a collar on said tubular member therein and adapted when moved to cause movement of said tubular member in one direction and said spring being adapted to cause movement thereof in the opposite direction.

2. A device of the class described, comprising a tapered member having a tubular member passing through both ends thereof, a rod attached to a removable collar on said tubular member within said tapered member and extending without said tapered member whereby movement of said rod may move said tubular member in one direction and a spring secured to said tubular member adapted to move the same in the opposite direction and means whereby liquid may be passed through said tubular member.

3. A device of the class described, comprising a tapered member having a tubular member passing through both ends thereof, a rod attached to a removable collar on said tubular member within said tapered member and extending without said tapered member whereby movement of said rod may move said tubular member in one direction and a spring secured to said tubular member adapted to move the same in the opposite direction and means whereby liquid may be passed through said tubular member, and means whereby liquid passing through said tubular member may be drained back through said tapered member.

4. A device of the class described, comprising a tapered member, a tubular member having a nozzle on the forward end thereof and having its rearward end passing into said tapered member, a second tubular member removably joined to said first tubular member and connected at its rearward end with a source of liquid supply, whereby liquid may pass therethrough and out of said nozzle, and a rod secured to one of said tubular members whereby they may be moved longitudinally in one direction and a spring on one of said tubular members adapted to move them longitudinally in the opposite direction.

5. A device of the class described, comprising a tapered member, a tubular member having a nozzle on the forward end thereof and having its rearward end passing into said tapered member, a second tubular member removably joined to said first tubular member and connected at its rearward end with a source of liquid supply, whereby liquid may pass therethrough and out of said nozzle, and a rod secured to one of said tubular members whereby they may be moved longitudinally in one direction and a spring on one of said tubular members adapted to move them longitudinally in the opposite direction, and holes in the forward end of said tapered member adapted to drain through said tapered member, liquid which has been dispensed through said tubular members and nozzle.

JOSEPH W. DEBEN.